(12) United States Patent
Chen (10) Patent No.: US 10,015,863 B2
(45) Date of Patent: Jul. 3, 2018

(54) CHANGING SCREEN BRIGHTNESS OF A COMPUTING DEVICE

(71) Applicant: HEWLETT-PACKARD DEVELOPMENT COMPANY, L.P., Houston, TX (US)

(72) Inventor: Chun-Chieh Chen, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,566

(22) PCT Filed: May 28, 2014

(86) PCT No.: PCT/US2014/039762
§ 371 (c)(1),
(2) Date: Oct. 25, 2016

(87) PCT Pub. No.: WO2015/183259
PCT Pub. Date: Dec. 3, 2015

(65) Prior Publication Data
US 2017/0079118 A1    Mar. 16, 2017

(51) Int. Cl.
| | | |
|---|---|---|
| G09G 5/10 | (2006.01) |
| H05B 37/02 | (2006.01) |
| G06F 3/01 | (2006.01) |
| G06N 99/00 | (2010.01) |
| G06K 9/00 | (2006.01) |

(52) U.S. Cl.
CPC ......... *H05B 37/0227* (2013.01); *G06F 3/013* (2013.01); *G06N 99/005* (2013.01); *G09G 5/10* (2013.01); *H05B 37/0218* (2013.01); *G06K 9/0061* (2013.01); *G06K 9/00604* (2013.01); *G09G 2320/0613* (2013.01); *G09G 2320/0626* (2013.01); *G09G 2360/144* (2013.01)

(58) Field of Classification Search
CPC ............ H05B 37/0227; H05B 37/0218; G06N 99/005; G06K 9/00604
See application file for complete search history.

(56) References Cited

U.S. PATENT DOCUMENTS

| | | | |
|---|---|---|---|
| 8,537,174 B2 | 9/2013 | Capener | |
| 2005/0212684 A1* | 9/2005 | Huang | G03B 15/05 340/815.45 |
| 2007/0273624 A1 | 11/2007 | Geelen | |

(Continued)

FOREIGN PATENT DOCUMENTS

KR    10-2006-0057405    5/2006

*Primary Examiner* — Shaheda Abdin
(74) *Attorney, Agent, or Firm* — HPI Patent Department (57) ABSTRACT

Examples relate to changing screen brightness of a computing device. One example enables determination of whether the computing device is being used for one of a set of predetermined application types. The screen brightness of the computing device may be changed based on a set of first brightness values associated with the first predetermined application type responsive to the computing device being used for a first predetermined application type and based on a set of second brightness values associated with the second predetermined application type responsive to the computing device being used for a second predetermined application type.

15 Claims, 6 Drawing Sheets

(56) References Cited

U.S. PATENT DOCUMENTS

| | | | |
|---|---|---|---|
| 2008/0111833 A1* | 5/2008 | Thorn | G09G 5/00 345/690 |
| 2008/0165116 A1 | 7/2008 | Herz et al. | |
| 2013/0100097 A1 | 4/2013 | Martin | |
| 2013/0127980 A1* | 5/2013 | Haddick | G06F 3/013 348/14.08 |

* cited by examiner

> 440 CHANGE SCREEN BRIGHTNESS OF COMPUTING DEVICE
>
> > 441 CHANGE SCREEN BRIGHTNESS OF COMPUTING DEVICE BASED ON SET OF BRIGHTNESS VALUES ASSOCIATED WITH FIRST LED DEVICE RESPONSIVE TO COMPUTING DEVICE BEING USED IN PROXIMITY OF FIRST LED DEVICE

FIG. 4B

> 440 CHANGE SCREEN BRIGHTNESS OF COMPUTING DEVICE
>
> > 442 CHANGE SCREEN BRIGHTNESS OF COMPUTING DEVICE BASED ON SET OF BRIGHTNESS VALUES ASSOCIATED WITH FIRST LED DEVICE AND SET OF BRIGHTNESS VALUES ASSOCIATED WITH SECOND LED DEVICE RESPONSIVE TO COMPUTING DEVICE BEING USED IN PROXIMITY OF FIRST LED DEVICE AND SECOND LED DEVICE

CHANGING SCREEN BRIGHTNESS OF A COMPUTING DEVICE

BACKGROUND

Computing devices may automatically change a brightness of a screen of a device based on disparate, predetermined conditions being met. For example, a computing device may change screen brightness responsive to the device entering a power-saving mode. In another example, a computing device may change screen brightness responsive to a user manually changing screen brightness.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

A system may automatically change the brightness of a screen of a computing device based on various conditions. In some examples, the system may change screen brightness of the computing device based on usage of the computing device, proximity of a set of LED devices, any combination thereof, and/or other conditions.

The system may change screen brightness based on a set of brightness values associated with each condition. For example, the system may change screen brightness to a first brightness value for a first predetermined type of usage (e.g., a first predetermined application type running on the computing device) and may change screen brightness to a second brightness value for a second predetermined type of usage (e.g., a second predetermined application type running on the computing device). In another example, the system may change screen brightness to a first brightness value responsive to a first LED device being used within a predetermined proximity of the computing device and may change its screen brightness to a second brightness value responsive to a second LED device (or second set of LED devices) being used within a predetermined proximity of the computing device.

The system may revise a set of brightness values associated with a condition. The system may revise the set of brightness values based on, for example, ambient light conditions, monitored pupil dilation of a user, any combination thereof, and/or other factors that may affect user experience of the computing device.

Figure 1:
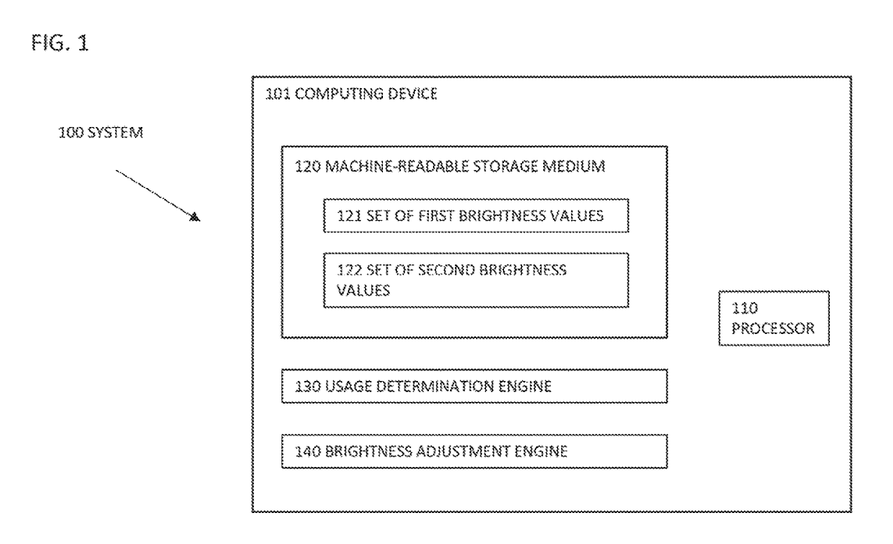
FIG. 1 is a block diagram of an example system for changing screen brightness based on usage.

Referring now to the drawings, FIG. 1 is a block diagram of an example system 100 for changing screen brightness of a computing device 101. Computing device 101 may be a notebook, desktop, tablet, workstation, mobile device, retail point of sale device, smartphone, all-in-one (AiO) computer, gaming device, or any other device suitable for executing the functionality described below. In the example depicted in FIG. 1, computing device 101 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions to enable changing screen brightness of a computing device, as described below. As an alternative or in addition to retrieving and executing instructions, processor 110 may include one or more electronic circuits comprising a number of electronic components for performing the functionality of one or more of instructions.

In one example, the program instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on computing device 100.

Machine-readable storage medium 120 may be any hardware storage device for maintaining data accessible to computing device 100. For example, machine-readable storage medium 120 may include one or more hard disk drives, solid state drives, tape drives, and/or any other storage devices. The storage devices may be located in computing device 101 and/or in another device in communication with computing device 101. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for changing screen brightness of a computing device. As detailed below, storage medium 120 may maintain and/or store the data and information described herein.

In some examples, the storage medium 120 may store information related to the set of conditions based on which the system 100 may change the screen brightness of the computing device 101. The set of conditions may include, for example, usage of predetermined application types, proximity of LED devices, and/or other conditions. Predetermined application types may comprise, for example, gaming, multimedia usage, reading, and/or other predetermined application types. In some examples, a condition may comprise occurrence of multiple events (e.g., usage of a predetermined application type and determination of a predetermined amount of ambient light, proximity of multiple LED devices, usage of a predetermined application type and proximity of an LED device, and/or occurrence of other events at a same time).

The storage medium 120 may also store sets of brightness values, such that an individual set of brightness values may correspond to an individual condition. For example, for a first predetermined application type that may be stored in the storage medium 120, the storage medium 120 may store a set of first brightness values 121 that may correspond to the first predetermined application type. Similarly, for a second predetermined application type, the storage medium 120 may store a set of second brightness values 122. An individual set of brightness values may comprise a single brightness value to which the screen brightness of the computing device 100 should be changed responsive to the individual condition met, may comprise a linear scale of values that correspond to different factors that may affect the predetermined application type, may comprise a curve representing values that correspond to the different factors, may comprise a function by which a value may be determined, and/or may otherwise represent a set of brightness values for screen brightness of a computing device. In some examples, a factor may include an ambient light value determined by the computing device 100, a monitored pupil dilation value of a user, time of usage, current location of the computing device, user of the computing device, and/or other factors.

As discussed further below, responsive to the system 100 determining that a condition for changing screen brightness has been met, the system 100 may determine the brightness value to which the screen brightness of the computing device 100 should be changed based on the set of brightness values associated with the condition.

As detailed below, system 100 may comprise computing device 101. Computing device 101 may include a series of engines 130-140 for changing screen brightness of the computing device. Each of the engines may generally represent any combination of hardware and programming. For example, the programming for the engines may be processor executable instructions stored on a non-transitory machine-readable storage medium and the hardware for the engines may include at least one processor of the computing device 101 to execute those instructions. In addition or as an alternative, each engine may include one or more hardware devices including electronic circuitry for implementing the functionality described below.

In some examples, system 100 may also comprise a camera that may be used in changing the screen brightness of the computing device 101 (e.g., as described below with respect to FIG. 3).

Returning to FIG. 1, usage determination engine 130 may determine whether the computing device 101 is being used for one of the set of predetermined application types. For example, usage determination engine 130 may determine the current usage of the computing device 101 (e.g., the application being displayed on the screen of the computing device 101). Usage determination engine 130 may compare the determined application with the set of predetermined application types stored in the storage medium 120.

Brightness adjustment engine 140 may change the screen brightness of the computing device 101 responsive to determining that a condition stored in the storage medium 120 has been met. For example, brightness adjustment engine 140 may change the screen brightness of the computing device 101 based on a set of first brightness values associated with a first predetermined application type responsive to the usage determination engine determining that the computing device 101 is being used for that first predetermined application type.

As mentioned above, an individual set of brightness values may comprise a single brightness value to which the screen brightness of the computing device 101 should be changed responsive to the individual condition met, may comprise a linear scale of values that correspond to different factors that may affect the predetermined application type, may comprise a curve representing values that correspond to the different factors, may comprise a function by which a value may be determined, and/or may otherwise represent a set of brightness values for screen brightness of a computing device.

Responsive to the set of brightness values associated with the first predetermined application type comprising a single individual brightness value, the brightness adjustment engine 140 may change the screen brightness of the computing device 101 to that single individual brightness value.

Responsive to the set of brightness values associated with the first predetermined application type comprising a linear scale of values that correspond to different factors that may affect the predetermined application type, the brightness adjustment engine 140 may determine the factors associated with the predetermined application type and the corresponding values associated with those factors. For example, the brightness adjustment engine 140 may access the factors, the values, and/or other related information from the storage medium 120. Based on the factors and their corresponding values, the brightness adjustment engine 140 may change the screen brightness of the computing device 101 to a brightness value on the linear scale of values.

Responsive to the set of brightness values associated with the first predetermined application type comprising a curve representing values that correspond to the different factors, the brightness adjustment engine 140 may determine the factors associated with the predetermined application type and the corresponding values associated with those factors. For example, the brightness adjustment engine 140 may access the factors, the values, and/or other related information from the storage medium 120. Based on the factors and their corresponding values, the brightness adjustment engine 140 may change the screen brightness of the computing device 101 to a brightness value of the curve.

Responsive to the set of brightness values associated with the first predetermined application type comprising a function by which a value may be determined, the brightness adjustment engine 140 may determine the factors associated with the predetermined application type and the corresponding values associated with those factors. For example, the brightness adjustment engine 140 may access the factors, the values, and/or other related information from the storage medium 120. Based on the factors and their corresponding values, the brightness adjustment engine 140 may change the screen brightness of the computing device 101 to a brightness value calculated using the function.

In some examples, a factor may include an ambient light value determined by the system 100, a monitored pupil dilation of the user, time of usage, current location of the computing device, a user of the computing device 101, and/or other factors.

The brightness adjustment engine 140 may change the screen brightness of the computing device 101 in other ways based on the set of brightness values, and is not limited to the examples described herein.

Figure 2:
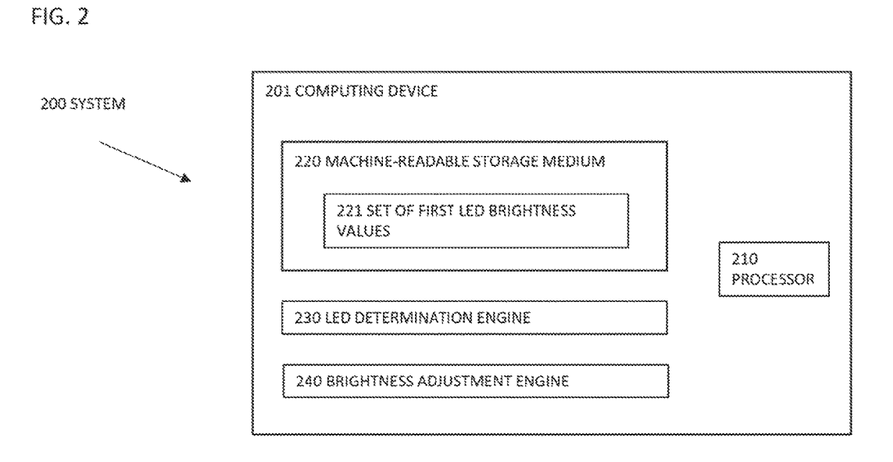
FIG. 2 is a block diagram of an example system for changing screen brightness based on proximity of LED devices.

Referring now to the drawings, FIG. 2 is a block diagram of an example system 200 for changing screen brightness of a computing device 201. Computing device 201 may be a notebook, desktop, tablet, workstation, mobile device, retail point of sale device, smartphone, all-in-one (AiO) computer, gaming device, or any other device suitable for executing the functionality described below. In the example depicted in FIG. 2, computing device 201 includes a processor 220 and a machine-readable storage medium 210.

Processor 220 may be one or more central processing units (CPUs), microprocessors, and/or other hardware devices suitable for retrieval and execution of instructions stored in machine-readable storage medium 220. Processor 220 may fetch, decode, and execute program instructions to enable changing screen brightness of a computing device, as described below. As an alternative or in addition to retrieving and executing instructions, processor 220 may include one or more electronic circuits comprising a number of electronic components for performing the functionality of one or more of instructions.

In one example, the program instructions can be part of an installation package that can be executed by processor 220 to implement the functionality described herein. In this case, memory 220 may be a portable medium such as a CD, DVD, or flash drive or a memory maintained by a computing device from which the installation package can be downloaded and installed, in another example, the program instructions may be part of an application or applications already installed on computing device 201.

Machine-readable storage medium 220 may be any hardware storage device for maintaining data accessible to computing device 201. For example, machine-readable storage medium 220 may include one or more hard disk drives, solid state drives, tape drives, and/or any other storage devices. The storage devices may be located in computing device 201 and/or in another device in communication with computing device 201. For example, machine-readable storage medium 220 may be any electronic, magnetic, optical, or other physical storage device that stores executable instructions. Thus, machine-readable storage medium 220 may be, for example, Random Access Memory (RAM), an Electrically-Erasable Programmable Read-Only Memory (EEPROM), a storage drive, an optical disc, and the like. As described in detail below, machine-readable storage medium 220 may be encoded with executable instructions for changing screen brightness of a computing device. As detailed below, storage medium 220 may maintain and/or store the data and information described herein.

The storage medium 220 may store information related to the set of conditions based on which the system 200 may change screen brightness of the computing device 201. The storage medium 220 may store sets of brightness values, such that an individual set of brightness values may correspond to an individual condition. The information stored by storage medium 220 may be the same as or similar to the information stored by storage medium 120.

As discussed further below, responsive to the system 200 determining that a condition for changing screen brightness has been met, the system 200 may determine the brightness value to which the screen brightness of the computing device 201 should be changed based on the set of brightness values associated with the condition.

As detailed below, system 200 may comprise a computing device 201. Computing device 201 may include a series of engines 230-240 for changing screen brightness of the computing device. Each of the engines may generally represent any combination of hardware and programming. For example, the programming for the engines may be processor executable instructions stored on a non-transitory machine-readable storage medium and the hardware for the engines may include at least one processor of the computing device 201 to execute those instructions. In addition or as an alternative, each engine may include one or more hardware devices including electronic circuitry for implementing the functionality described below.

In some examples, system 200 may also comprise a camera that may be used in changing the screen brightness of the computing device 201 (e.g., as described below with respect to FIG. 3).

LED determination engine 230 may determine whether a set of LED devices is being used within a predetermined proximity of the computing device 201. In some instances, the system 200 and/or the LED determination engine 230 may be aware of a predetermined set of LED devices that may be in proximity of the computing device 201. For example, the computing device 201 may have stored thereon an API for each of the predetermined set of LED devices, in this example, the LED determination engine 230 may determine whether an individual LED device is within a predetermined proximity of the computing device 201 by determining whether the API associated with that individual LED device is being accessed. in some examples, the LED determination engine 230 may also determine a predetermined proximity of the LED device whose API is being accessed based on information obtained from the API, based on sensors, cameras, and/or other equipment of the computing device 201, and/or in other ways.

In some examples, the storage medium 220 may store a different distance for each predetermined LED device, such that a first device may need to be within a first distance of the computing device 201 to be considered within the predetermined proximity, whereas a second device may need to be within a second distance different from the first distance to be considered within the predetermined proximity.

Brightness adjustment engine 240 may change the screen brightness of the computing device 201 responsive to determining that a set of LED devices are within a predetermined proximity of the computing device. For example, the brightness adjustment engine 240 may change the screen brightness based on a set of first LED brightness values associated with a first LED device within a predetermined proximity of the computing device 201 and a determined ambient light value responsive to LED determination engine 230 determining that the first LED device is used within the predetermined proximity of the computing device 201. The brightness adjustment engine 240 may determine the ambient light value using a camera, sensor, and/or other equipment that may determine an ambient light value.

In some examples, the brightness adjustment engine 240 may change the screen brightness of the computing device 201 responsive to determining that multiple LED devices are within a predetermined proximity to the computing device. For example, the brightness adjustment engine 240 may change the screen brightness of the computing device 201 responsive to determining that a first LED device and a second LED device are within a predetermined proximity to the computing device 200.

The brightness adjustment engine 240 may change the screen brightness of the computing device 201 based on a set of first brightness values associated with a first LED device responsive to the LED determination engine 230 determining that the first LED device is being used within a predetermined proximity of the computing device 201.

As mentioned above, an individual set of brightness values may comprise a single brightness value to which the screen brightness of the computing device 201 should be changed responsive to the individual condition met, may comprise a linear scale of values that correspond to different factors that may affect the predetermined application type, may comprise a curve representing values that correspond to the different factors, may comprise a function by which a value may be determined, and/or may otherwise represent a set of brightness values for screen brightness of a computing device.

Responsive to the set of brightness values associated with the first predetermined application type comprising a single individual brightness value, the brightness adjustment engine 240 may change the screen brightness of the computing device 201 to that single individual brightness value.

Responsive to the set of brightness values associated with the first predetermined application type comprising a linear scale of values that correspond to different factors that may affect the predetermined application type, the brightness adjustment engine 240 may determine the factors associated with the predetermined application type and the corresponding values associated with those factors. For example, the brightness adjustment engine 240 may access the factors, the values, and/or other related information from the storage medium 220. Based on the factors and their corresponding values, the brightness adjustment engine 240 may change the screen brightness of the computing device 201 to a brightness value on the linear scale of values.

Responsive to the set of brightness values associated with the first predetermined application type comprising a curve representing values that correspond to the different factors, the brightness adjustment engine 240 may determine the factors associated with the predetermined application type and the corresponding values associated with those factors. For example, the brightness adjustment engine 240 may access the factors, the values, and/or other related information from the storage medium 220. Based on the factors and their corresponding values, the brightness adjustment engine 240 may change the screen brightness of the computing device 201 to a brightness value of the curve.

Responsive to the set of brightness values associated with the first predetermined application type comprising a function by which a value may be determined, the brightness adjustment engine 240 may determine the factors associated with the predetermined application type and the corresponding values associated with those factors. For example, the brightness adjustment engine 240 may access the factors, the values, and/or other related information from the storage medium 220. Based on the factors and their corresponding values, the brightness adjustment engine 240 may change the screen brightness of the computing device 201 to a brightness value calculated using the function.

The brightness adjustment engine 240 may change the screen brightness of the computing device 201 in other ways based on the set of brightness values, and is not limited to the examples described herein.

Figure 3:
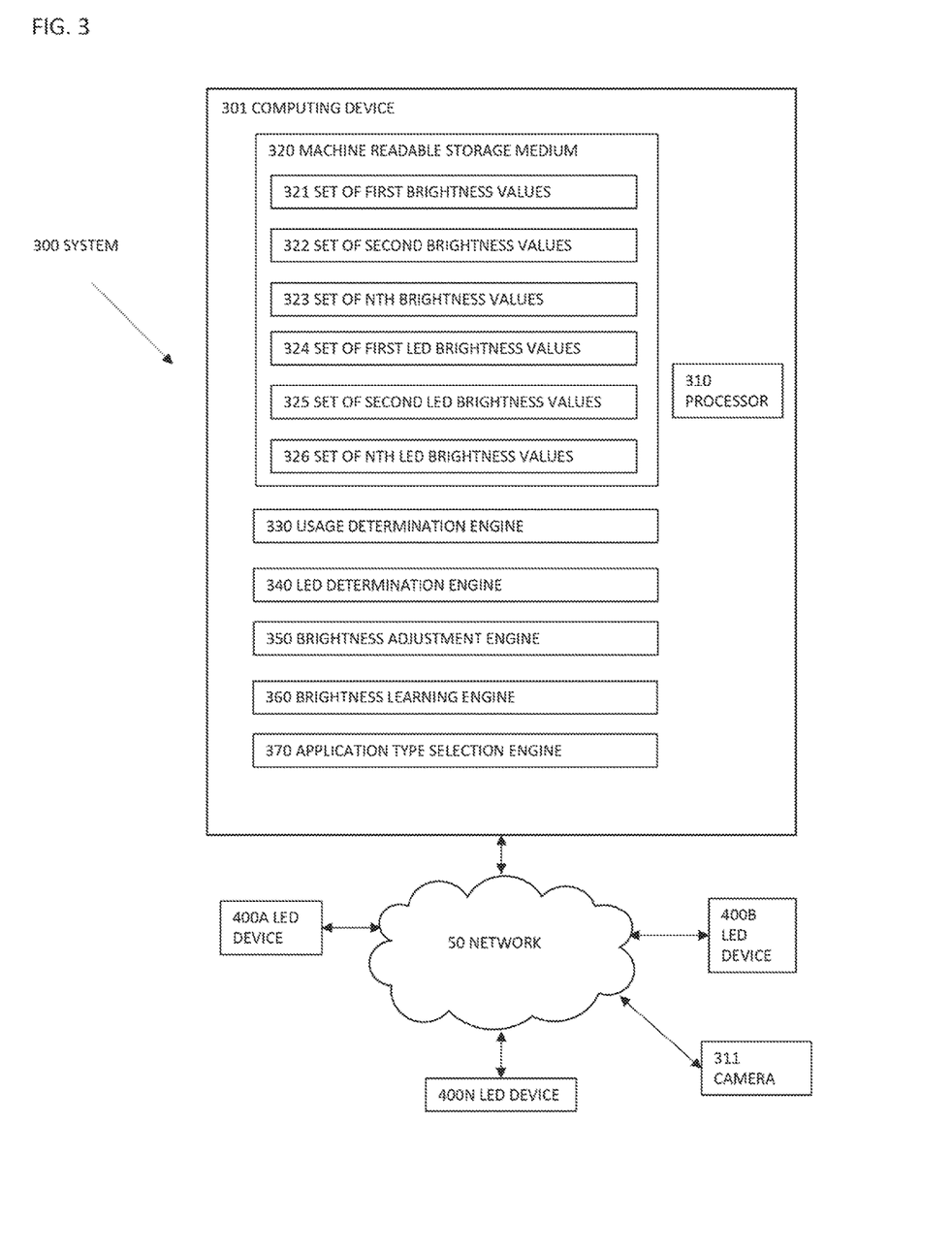
FIG. 3 is a block diagram of an example system for changing screen brightness based on various conditions.

FIG. 3 is a block diagram of an example computing device 300 that may be in communication with a plurality of LED devices 400, 400B, . . . , 400N.

In the example depicted in FIG. 3 and described below, system 300 may comprise a computing device 301, a set of LED devices 400A, 400B, . . . , 400N, a camera 311, and/or other components for changing screen brightness of the computing device 301. The computing device 301 may communicate with LED devices 400A, 400B, . . . , 400N via a network 50. Network 50 may be any wired, wireless, and/or other type of network via which the components of system 300 may communicate.

As with computing device 101 of FIG. 1 and computing device 201 of FIG. 2, computing device 301 may be a notebook, desktop, tablet, workstation, mobile device, retail point of sale device, smartphone, all-in-one (AiO) computer, gaming device, or any other device suitable for executing the functionality described below.

As with processor 110 of FIG. 1 and processor 210 of FIG. 2, processor 310 may be one or more CPUs, microprocessors, and/or other hardware devices suitable for retrieval and execution of instructions. As with storage medium 120 of FIG. 1 and storage 220 of FIG. 2, machine-readable storage medium 320 may be any hardware storage device for maintaining data accessible to computing device 301. In some examples, the storage medium 320 may store information related to the set of conditions based on which the system 300 may change screen brightness of the computing device 301. In some examples, the storage medium 320 may store sets of brightness values, such that an individual set of brightness values may correspond to an individual condition. The information stored by storage medium 320 may be the same as or similar to the information stored by storage medium 120 and/or storage medium 220. For example, the storage medium 320 may comprise a set of first brightness values 321 associated with a first predetermined application type, a set of second brightness values 321 associated with a second predetermined application type, a set of nth brightness values 323 associated with an nth predetermined application type, a set of first LED brightness values 324 associated with a first LED device 400A, a set of second LED brightness values 325 associated with a second LED device 400B, a set of nth LED brightness values 326 associated with a nth LED device 400N, and/or other sets of brightness values.

In some examples, system 300 may comprise a camera 311. The camera 311 may be used to determine ambient light values, to determine pupil dilation of a user of the computing device, and/or to otherwise obtain information related to changing screen brightness of the computing device 301. The camera 311 may be integral to the computing device 301, externally mounted on the computing device 301, connected to computing device 301 via network 50, and/or otherwise communicably coupled to the computing device 301.

As discussed further below, responsive to the system 300 determining that a condition for changing screen brightness has been met, the system 300 may determine the brightness value to which the screen brightness of the computing device 301 should be changed based on the set of brightness values associated with the condition.

As detailed below, system 300 may include a series of engines 330-360 for changing screen brightness of a computing device. For example, computing device 301 may comprise the series of engines 330-360. Each of the engines may generally represent any combination of hardware and programming. For example, the programming for the engines may be processor executable instructions stored on a non-transitory machine-readable storage medium and the hardware for the engines may include at least one processor of the computing device 301 to execute those instructions. In addition or as an alternative, each engine may include one or more hardware devices including electronic circuitry for implementing the functionality described below.

Usage determination engine 330 may determine whether the computing device 301 is being used for one of the set of predetermined application types. In some examples, the usage determination engine 320 may determine whether the computing device 301 is being used for one of the set of predetermined application types in a manner the same as or similar to that of the system 100. Further details regarding an example implementation of usage determination engine 330 are provided above in connection with usage determination engine 130 of FIG. 1.

LED determination engine 340 may determine whether a set of LED devices (e.g., one or more of LED devices 400A, 400B, . . . , 400N) is being used within a predetermined proximity of the computing device 301. In some examples, the LED determination engine 340 may determine whether a set of LED devices is being used within a predetermined proximity of the computing device 301 in a manner the same as or similar to that of the system 200. Further details regarding an example implementation of LED determination engine 340 are provided above in connection with LED determination engine 230 of FIG. 2.

Brightness adjustment engine 140 may change the screen brightness of the computing device 301 responsive to determining that a condition stored in the storage medium 120 has been met. For example, brightness adjustment engine 140 may change the screen brightness of the computing device 301 based on a set of first brightness values associated with a first predetermined application type responsive to the usage determination engine determining that the computing device 301 is being used for that first predetermined application type. In another example, brightness adjustment engine 350 may change the screen brightness of the computing device 301 responsive to determining that a set of LED devices are within a predetermined proximity of the computing device, and/or based on other conditions being met. In some examples, the brightness adjustment engine 350 may change the screen brightness of the computing device 301 in a manner the same as or similar to that of the system 100 and/or system 200. Further details regarding an example implementation of brightness adjustment engine 350 are provided above in connection with brightness adjustment engine 140 and brightness adjustment engine 240 of FIG. 1.

Brightness learning engine 360 may determine a set of brightness values associated with a condition. For example, the brightness learning engine 360 may determine the set of first brightness values for the first predetermined application. The brightness learning engine 360 may determine the set of first brightness values for the first predetermined application type based on monitored pupil dilation values of a user of the computing device 301 during usage of the computing device 301 for the first predetermined application type. The camera 311 may obtain pupil dilation values of the user at predetermined time thresholds and may store the obtained pupil dilation values in the storage medium 320. In some examples, the brightness learning engine 360 may determine the set of first brightness values based on pupil dilation of the user, based on determined ambient light values during usage of the computing device 301 for the first predetermined application type.

In some examples, the brightness learning engine 360 may determine an optimal brightness curve for the first predetermined application type based on the monitored pupil dilation values, the determined ambient light values, and/or other factors related to screen brightness during usage of the computing device 301 for the first predetermined application type.

In another example, the brightness learning engine 360 may determine the set of first LED brightness values associated with the first LED device. The brightness learning engine 360 may determine the set of first LED brightness values for the first LED device based on monitored pupil dilation values of a user of the computing device 301 while the first LED device is within the predetermined proximity to the computing device 301. The camera 311 may obtain pupil dilation values of the user at predetermined time thresholds and may store the obtained pupil dilation values in the storage medium 320. In some examples, the brightness learning engine 360 may determine the set of first LED brightness values based on pupil dilation of the user, based on determined ambient light values while the first LED device is within the predetermined proximity to the computing device 301.

In some examples, the brightness learning engine 360 may determine an optimal brightness curve for the first LED device based on the monitored pupil dilation values, the determined ambient light values, and/or other factors related to screen brightness while the first LED device is within the predetermined proximity to the computing device 301.

Application type selection engine 370 may determine the predetermined application types responsive to usage of the computing device 301. For example, the application type selection engine 370 may revise the set of predetermined application types stored in the storage medium 320 based on usage of the computing device 301. In some examples, the application type selection engine 370 may add a new application type responsive to the set of predetermined application types not including the new application type. The application type selection engine 370 may add a new application type based on the new application type being used for more than a threshold amount of time, based on the new application type being used more frequently than a predetermined number of other application types, based on the new application type using a predetermined percentage of processing capabilities, based on usage of the new application being one of a top used application types (e.g., one of the top predetermined number of application types used on the computing device 301), and/or based on other factors related to usage of the new application type.

Figure 4:
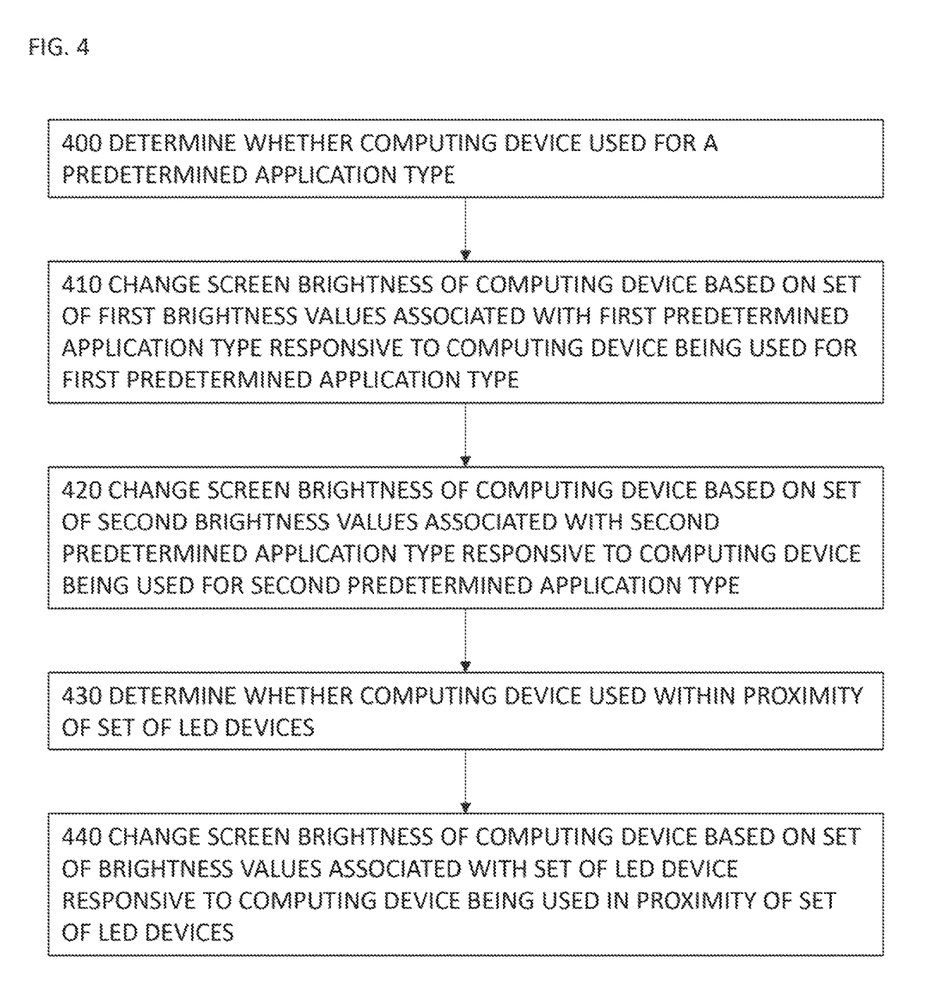
FIG. 4 is a flowchart of an example method for execution by a system for changing screen brightness of a computing device.
Figure 4A:
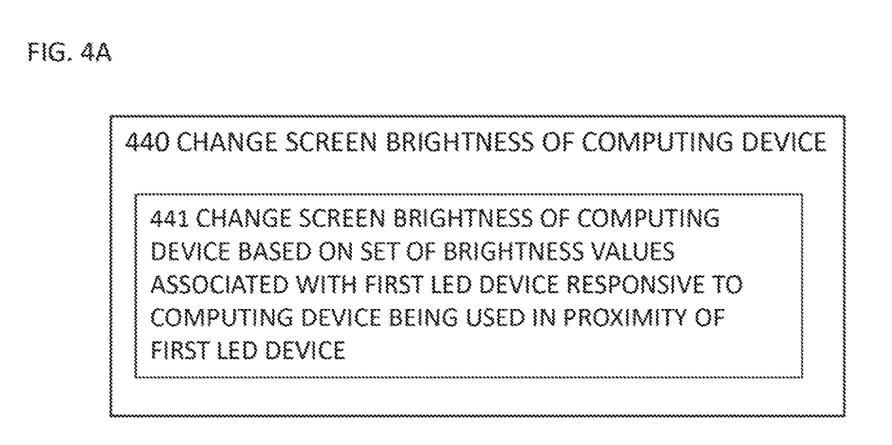
FIG. 4A is a flowchart of an example method for execution by a system for changing screen brightness of a computing device.
Figure 4B:
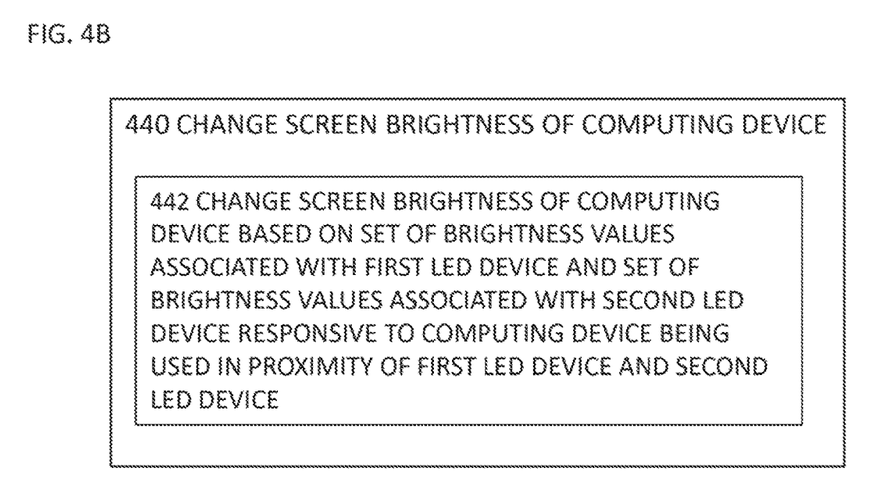
FIG. 4B is a flowchart of an example method for execution by a system for changing screen brightness of a computing device.

FIG. 4 is a flowchart of an example method for execution by a system for changing screen brightness of a computing device. FIGS. 4A and 4B are flowcharts of an example method for execution by a system for changing screen brightness.

Although execution of the method described below is with reference to system 300 of FIG. 3, other suitable devices for execution of this method will be apparent to those of skill in the art (e.g., system 100 of FIG. 1, and/or system 200 of FIG. 2, and/or other devices). The method described in FIG. 4 and other figures may be implemented in the form of executable instructions stored on a machine-readable storage medium, such as storage medium 320, by one or more engines described herein, and/or in the form of electronic circuitry.

In an operation 400, a determination may be made as to whether a computing device is used for a predetermined application type. For example, the system 300 (and/or the usage determination engine 330, or other resource of the system 300) may determine whether the computing device is used for a predetermined application type. The system 300 may determine whether the computing device 301 is used for a predetermined application type in a manner similar or the same as that described above in relation to the execution of the usage determination engine 330, and/or other resource of the system 300.

In an operation 410, the screen brightness of the computing device may be changed based on a set of first brightness values associated with a first predetermined application type responsive to the computing device being used for the first predetermined application type. For example, the system 300 (and/or the brightness adjustment engine 350, or other resource of the system 300) may change the screen brightness. The system 300 may change the screen brightness in a manner similar or the same as that described above in relation to the execution of the brightness adjustment engine 350, and/or other resource of the system 300.

In an operation 420, the screen brightness of the computing device may be changed based on a set of second brightness values associated with a second predetermined application type responsive to the computing device being used for the second predetermined application type. For example, the system 300 (and/or the brightness adjustment engine 350, or other resource of the system 300) may change the screen brightness. The system 300 may change the screen brightness in a manner similar or the same as that described above in relation to the execution of the brightness adjustment engine 350, and/or other resource of the system 300.

In an operation 430, a determination may be made as to whether the computing device is used in the proximity of the set of LED devices. For example, the system 300 (and/or the LED determination engine 340, or other resource of the system 300) may determine whether the computing device is used in the proximity of the set of LED devices. The system 300 may determine whether the computing device is used in the proximity of the set of LED devices in a manner similar or the same as that described above in relation to the execution of the LED determination engine 340, and/or other resource of the system 300.

In an operation 440, the screen brightness of the computing device may be changed based on a set of LED brightness values associated with a set of LED devices responsive to the computing device being used in proximity of the set of LED devices. For example, the system 300 (and/or the brightness adjustment engine 350, or other resource of the system 300) may change the screen brightness. The system 300 may change the screen brightness in a manner similar or the same as that described above in relation to the execution of the brightness adjustment engine 350, and/or other resource of the system 300.

In some examples, and as illustrated in FIG. 4A, in an operation 441, the screen brightness of the computing device may be changed based on a set of first LED brightness values associated with a first LED device responsive to the computing device being used in proximity of the first LED device. For example, the system 300 (and/or the brightness adjustment engine 350, or other resource of the system 300) may change the screen brightness. The system 300 may change the screen brightness in a manner similar or the same as that described above in relation to the execution of the brightness adjustment engine 350, and/or other resource of the system 300.

In some examples, and as illustrated in FIG. 4B, in an operation 442, the screen brightness of the computing device may be changed based on a set of first LED brightness values associated with a first LED device and a set of second LED brightness values responsive to the computing device being used in proximity of the first LED device and the second LED device. For example, the system 300 (and/or the brightness adjustment engine 350, or other resource of the system 300) may change the screen brightness. The system 300 may change the screen brightness in a manner similar or the same as that described above in relation to the execution of the brightness adjustment engine 350, and/or other resource of the system 300.

Figure 5:
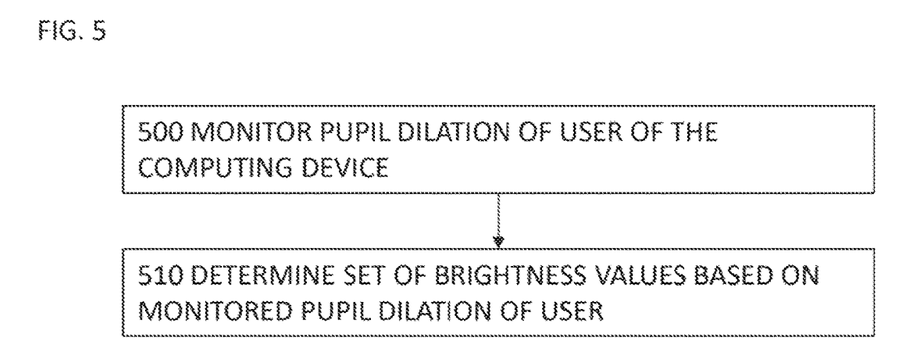
FIG. 5 is a flowchart of an example method for execution by a system for determining brightness values.
Figure 5A:
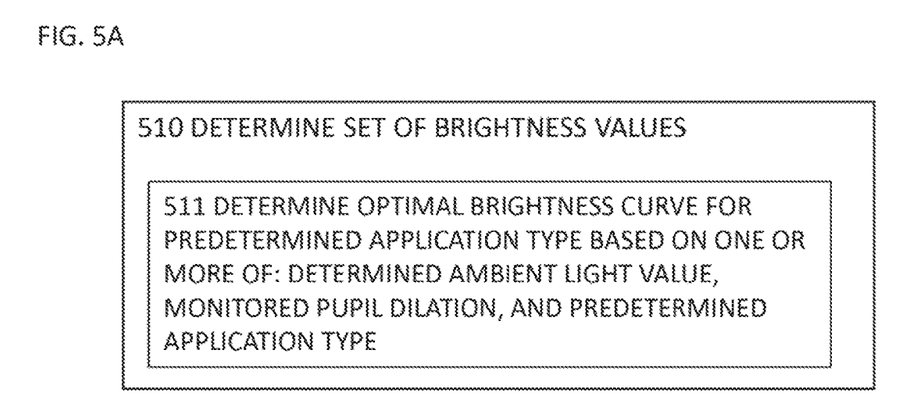
FIG. 5A is a flowchart of an example method for execution by a system for determining brightness values.
Figure 5B:
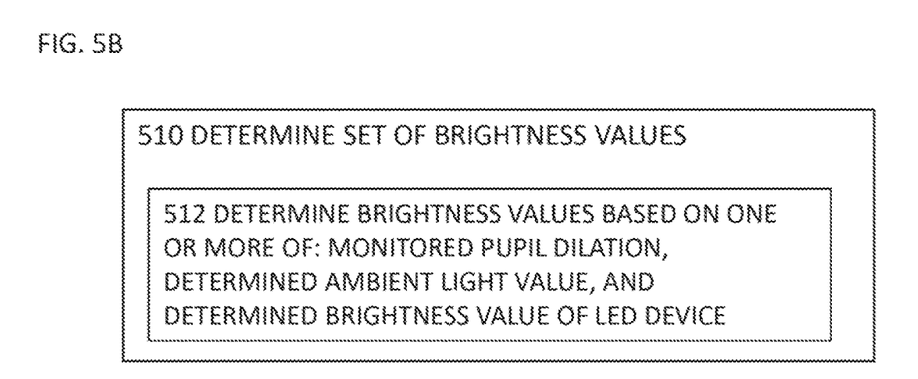
FIG. 5B is a flowchart of an example method for execution by a system for determining brightness values.

FIG. 5 is a flowchart of an example method for execution by a system for determining brightness values. FIGS. 5A and 5B are flowcharts of an example method for execution by a system for determining brightness values.

In an operation 500, the pupil dilation of a user of the computing device may be monitored. For example, the system 300 (and/or the camera 311, or other resource of the system 300) may monitor pupil dilation. The system 300 may monitor pupil dilation in a manner similar or the same as that described above in relation to the execution of the camera 311, and/or other resource of the system 300.

In an operation 510, a set of brightness values may be determined based on the monitored pupil dilation of the user. For example, the system 300 (and/or the brightness learning engine 360, or other resource of the system 300) may determine the set of brightness values. The system 300 may determine the brightness values in a manner similar or the same as that described above in relation to the execution of the brightness learning engine 360, and/or other resource of the system 300.

In some examples, and as illustrated in FIG. 5A, in an operation 511, an optimal brightness curve for the set of brightness values for a predetermined application type may be determined based on one or more of: ambient light values, monitored pupil dilation, and predetermined application type. For example, the system 300 (and/or the brightness learning engine 360, or other resource of the system 300) may determine the set of brightness values. The system 300 may determine the brightness values in a manner similar or the same as that described above in relation to the execution of the brightness learning engine 360, and/or other resource of the system 300.

In some examples, and as illustrated in FIG. 5B, in an operation 512, a set of brightness values for a predetermined application type may be determined based on one or more of: ambient light values, monitored pupil dilation, and predetermined application type. For example, the system 300 (and/or the brightness learning engine 360, or other resource of the system 300) may determine the set of brightness values. The system 300 may determine the brightness values in a manner similar or the same as that described above in relation to the execution of the brightness learning engine 360, and/or other resource of the system 300.

Figure 6:
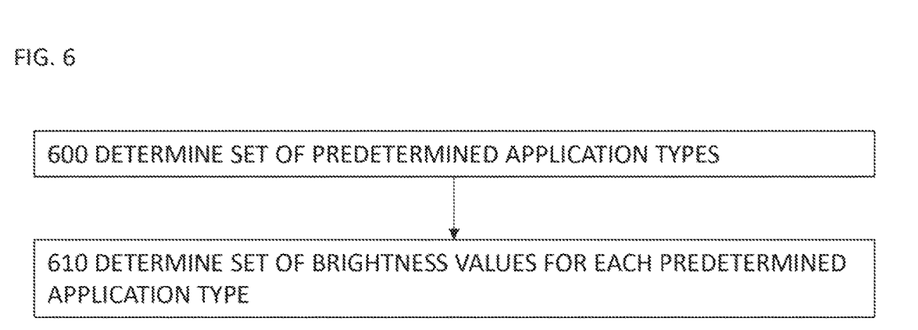
FIG. 6 is a flowchart of an example method for execution by a system for determining application types.

FIG. 6 is a flowchart of an example method for execution by a system for determining application types.

In an operation 600, a set of predetermined application types may be determined. For example, the system 300 (and/or the application type selection engine 370, or other resource of the system 300) may determine the set of predetermined application types. The system 300 may determine the set of predetermined application types in a manner similar or the same as that described above in relation to the execution of the application type selection engine 370, and/or other resource of the system 300.

In an operation 610, the computing device may determine a set of brightness values for each predetermined application type. For example, the system 300 (and/or the brightness learning engine 360, or other resource of the system 300) may determine the set of brightness values. The system 300 may determine the brightness values in a manner similar or the same as that described above in relation to the execution of the brightness learning engine 360, and/or other resource of the system 300.

Figure 7:
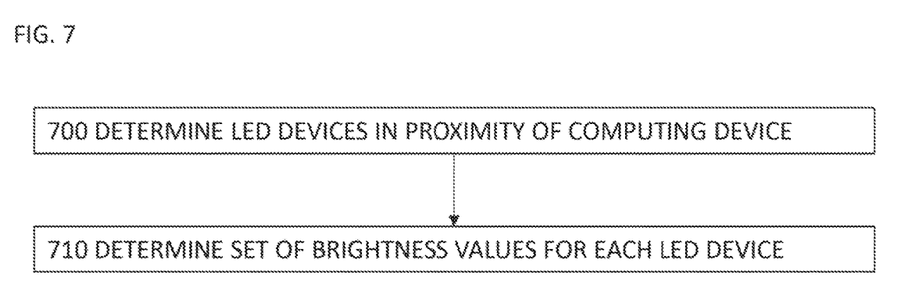
FIG. 7 is a flowchart of an example method for execution by a system for determining brightness values.

FIG. 7 is a flowchart of an example method for execution by a system for determining brightness values.

In an operation 700, the LED devices within a predetermined proximity of the computing device may be determined. For example, the computing device 100 (and/or the LED determination engine 340, or other resource of the computing device 100) may determine the LED devices. The computing device 100 may determine the LED devices in a manner similar or the same as that described above in relation to the execution of the LED determination engine 340, and/or other resource of the computing device 100.

In an operation 710, the computing device may determine a set of brightness values for each LED device and/or set of LED devices. For example, the system 300 (and/or the brightness learning engine 360, or other resource of the system 300) may determine the set of brightness values. The system 300 may determine the brightness values in a manner similar or the same as that described above in relation to the execution of the brightness learning engine 360, and/or other resource of the system 300.

The foregoing disclosure describes a number of examples for changing screen brightness of a computing device. The disclosed examples may include systems, devices, computer-readable storage media, and methods for changing screen brightness of a computing device. For purposes of explanation, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

I claim:

1. A system for changing screen brightness of a computing device, the system comprising:
   a usage determination engine to:
      determine an application being displayed on a screen of the computing device; and
      compare the determined application to a set of predetermined application types to determine whether a brightness changing condition has been met; and
   a brightness adjustment engine to:
      change the screen brightness of the computing device to a first single brightness value associated with a first predetermined application type of the set of predetermined application type when the determined application is the first predetermined application type; and
      change the screen brightness of the computing device based on a second single brightness value associated with a second predetermined application type of the set of predetermined application type when the determined application is the second predetermined application type.

2. The system of claim 1, further comprising:
   a brightness learning engine to determine the first and second brightness values based on first and second predetermined application types.

3. The system of claim 2, further comprising:
   a camera to monitor pupil dilation of a user of the computing device,
   wherein the brightness learning engine is to determine the first and second brightness values based on the monitored pupil dilation of the user.

4. The system of claim 2, wherein the brightness learning engine is to determine the first and second brightness values based on a determined ambient light value and the first predetermined application type.

5. The system of claim 1, further comprising:
   an application type selection engine to add a new application type to the predetermined application types responsive to usage of the computing device.

6. A system for changing screen brightness of a computing device, the system comprising:
   a LED determination engine to determine whether a first LED device is being used in the proximity of the computing device by determining whether an API associated with the first LED device is being accessed at the computing device;
   a brightness adjustment engine to:
      change the screen brightness of the computing device based on a set of first LED brightness values associated with the first LED device and a determined ambient light value in response to a determination that the first LED device is being used in the proximity of the computing device.

7. The system of claim 6, further comprising:
   a brightness learning engine to determine the set of first LED brightness values associated with the first LED device.

8. The system of claim 7, further comprising:
   a camera to monitor pupil dilation of a user of the computing device,
   wherein the brightness learning engine is to determine the set of first LED brightness values based on the monitored pupil dilation of the user and a determined brightness value of the first LED device.

9. The system of claim 7, wherein the brightness learning engine is to determine the set of first brightness values by determining an optimal brightness curve associated with the first LED device based on a determined ambient light value and a determined brightness value of the first LED device.

10. The system of claim 6, wherein the brightness adjustment engine is to change the screen brightness of the computing device based on the set of first LED brightness values associated with the first LED device and a set of second LED brightness values associated with a second LED device responsive to the first LED device and the second LED device being used in the proximity of the computing device.

11. A method for changing screen brightness of a computing device, comprising:

Determining, at the computing device, an application being displayed on a screen of the computing device;

Comparing, at the computing device, the determined application to a set of predetermined application types to determine whether a brightness changing condition has been met;

responsive to the determined application being a first predetermined application type, changing the screen brightness of the computing device to a first single brightness value associated with the first predetermined application type;

responsive to the determined application being a second predetermined application type, changing the screen brightness of the computing device to a second single brightness value associated with the second predetermined application type;

determining whether a first LED device is being used in the proximity of the computing device by determining whether an API associated with the first LED device is being accessed at the computing device; and responsive to a first LED device being used in the proximity of the computing device, changing the screen brightness of the computing device based on a set of first LED brightness values associated with the first LED device and a determined ambient light value.

12. The method of claim 11, further comprising:

monitoring, by a camera communicably coupled to the computing device, pupil dilation of a user of the computing device; and determining the set of first brightness values based on the monitored pupil dilation of the user.

13. The method of claim 12, further comprising:

determining the set of first brightness values by determining an optimal brightness curve for the predetermined application type based on a determined ambient light value and the first predetermined application type.

14. The method of claim 12, further comprising:

determining the set of first LED brightness values based on the monitored pupil dilation of the user and a determined brightness value of the first LED device.

15. The method of claim 11, further comprising:

changing the screen brightness of the computing device further based on time of usage, current location of the computing device, and/or a user of the computing device.

* * * * *

UNITED STATES PATENT AND TRADEMARK OFFICE
CERTIFICATE OF CORRECTION

PATENT NO. : 10,015,863 B2
APPLICATION NO. : 15/306566
DATED : July 3, 2018
INVENTOR(S) : Chun-Chieh Chen Page 1 of 1

It is certified that error appears in the above-identified patent and that said Letters Patent is hereby corrected as shown below:

In the Claims

In Column 15, Line 1, Claim 11, delete "Determining," and insert -- determining, --, therefor.

In Column 15, Line 3, Claim 11, delete "Comparing," and insert -- comparing, --, therefor.

Signed and Sealed this
Twentieth Day of November, 2018

Andrei Iancu
*Director of the United States Patent and Trademark Office*